(12) United States Patent
Perlman et al.

(10) Patent No.: US 6,473,431 B1
(45) Date of Patent: Oct. 29, 2002

(54) SYSTEM AND METHOD FACILITATING DETERMINATION BY ROUTER NODES IN A NETWORK OF RANGES OF ADDRESSES FOR WHICH EACH ROUTER NODE IS RESPONSIBLE

(75) Inventors: Radia J. Perlman, Acton, MA (US); Stephen R. Hanna, Bedford, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/346,801

(22) Filed: Jul. 2, 1999

(51) Int. Cl.[7] .................................. H04L 12/56
(52) U.S. Cl. .................. 370/400; 370/475; 709/242
(58) Field of Search ........................... 370/392, 393, 370/400, 379, 382, 475, 395.31, 395.54, 471; 709/242

(56) References Cited

U.S. PATENT DOCUMENTS

| | | | | |
|---|---|---|---|---|
| 5,724,510 A | * | 3/1998 | Arndt et al. | 395/200.5 |
| 5,815,664 A | * | 9/1998 | Asano | 395/200.57 |
| 5,854,901 A | * | 12/1998 | Cole et al. | 395/200.75 |
| 6,189,042 B1 | * | 2/2001 | Keller-Tuberg | 709/238 |
| 6,331,983 B1 | * | 12/2001 | Haggerty et al. | 370/400 |
| 6,339,595 B1 | * | 1/2002 | Rekhter et al. | 370/392 |
| 6,377,987 B1 | * | 4/2002 | Kracht | 709/220 |
| 6,396,833 B1 | * | 5/2002 | Zhang et al. | 370/392 |
| 6,400,715 B1 | * | 6/2002 | Beaudoin et al. | 370/392 |

OTHER PUBLICATIONS

Estrin, D. et al "A Dynamic Bootstrap Mechanism for Rendevous–Based Multicast Routing", INFOCOM, Mar. 21–25, 1999, vol. 3, pp. 1090–1098.*

* cited by examiner

Primary Examiner—Hassan Kizou
Assistant Examiner—Anh-Vu H Ly
(74) Attorney, Agent, or Firm—Weingarten, Schurgin, Gagnebin & Lebovici LLP (57) ABSTRACT

A network includes routers which route message packets among devices, thereby to facilitate transfer of information thereamong. Each router node makes use of routing information that identifies, inter alia, addresses and address ranges for which other router nodes are responsible, that the respective router node uses in routing a message packet that it receives. Each router node, through a negotiation operation with other router nodes, attempts to aggregate addresses for which it is responsible into one or more address ranges which do not overlap with addresses for which the other router nodes are responsible, and provides the address range(s), along with addresses for which it is responsible which could not be so aggregated, to the other router nodes for use as their routing information. Several methodologies are described for use in connection with the negotiation operations.

55 Claims, 4 Drawing Sheets

SYSTEM AND METHOD FACILITATING DETERMINATION BY ROUTER NODES IN A NETWORK OF RANGES OF ADDRESSES FOR WHICH EACH ROUTER NODE IS RESPONSIBLE

FIELD OF THE INVENTION

The invention relates generally to the field of digital data networks and more particularly to systems and methods for facilitating determination by router nodes in a network of ranges of addresses for which each router node is responsible.

BACKGROUND OF THE INVENTION

In modem "enterprise" digital data processing systems, that is, computer systems for use in an office environment in a company, a number of devices, such as personal computers, workstations, and other devices such as mass storage subsystems, network printers and interfaces to the public telephony system, are typically interconnected in a computer network. The personal computers and workstations (generally, "computers") are used by individual users to perform processing in connection with data and programs that may be stored in the network mass storage subsystems. In such an arrangement, the computers, operating as clients, access the data and programs from the network mass storage subsystems for processing. In addition, the computers will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the computers on the network.

Typically in a network, information is transferred in the form of packets, which are transferred from source devices, over communication links and through switching or router nodes, to destination devices. Each device is identified by an address, and each message packet includes a destination address which identifies the address of the device that is to receive the message packet as the destination device. As each router node receives a message packet from either the source device or another router node along a path from the source device to the destination device, it (that is, the router node) determines from the destination address the particular communication link or links over which it should transfer the message packet either to the next router node along the path to the destination device, or to the destination device itself. A group of devices connected in the network may also be identified by a so-called "multicast" address, in which case a message packet containing the multicast address as the destination address will be transferred to all of the devices in the group, and, if a router node receives a message packet whose destination address is a multicast address, it (that is, the router node) may transmit the message packet over one or a plurality of communication links connected thereto. The router nodes and switches, and perhaps other components which transfer message packets among devices, are generally also identified by respective addresses, and perhaps may be included in multicast groups, so as to facilitate transfer of message packets thereto. Typically, the addresses of individual devices and other components, which will also be referred to herein as "unicast" addresses, are static. On the other hand, the multicast addresses may be dynamic as respective multicast groups are formed and later dissolved.

Typically, a large-scale network such as a "wide area network" ("WAN") is organized into a number of regions, each including a number of devices and router nodes and other components. Generally, one of the router nodes in each region will effectively be used as an interface to the other regions so that, if a source device in one region wishes to send a message packet to a destination device in another region, it (that is, the source device) will transmit the message packet to the inter-region router node. The inter-region router node in the source device's region will, in turn, transfer the message packet to the inter-region router node in the destination device's region, and the inter-region router node in the destination device's region will forward the message packet in that region to the destination device.

Each of the inter-region router nodes makes use of routing information to identify the addresses for which each of the other inter-region router nodes is responsible, that is, the addresses for which it (the respective inter-region router node) is to transmit message packets which contain those addresses as destination addresses. In a large network, that is, a network including a large number of devices, such routing information may get to be correspondingly large, and would require a large amount of memory for each inter-region router node to store information for each address. Accordingly, it is generally desirable to store the address information as a range or ranges of addresses. However, it is typically difficult to determine address ranges which are appropriate for each router node to associate with other inter-region router nodes. This problem is exacerbated since the address ranges for which the respective inter-region router nodes re responsible, or with which they may be otherwise associated, may be relatively sparsely populated and may overlap with address ranges for other inter-region router nodes. In addition, the appropriate ranges may change if, for example, a device, router node or other component requiring an address is added to a network, or if unicast or multicast addresses are assigned on a dynamic basis, if routing policies change, or for other reasons which will be appreciated by those skilled in the art.

SUMMARY OF THE INVENTION

The invention provides a new and improved system and method for facilitating determination by router nodes in a network, particularly inter-region router nodes, of ranges of addresses for which each router node is responsible.

In brief summary, the invention provides a network including routers which route message packets among devices, thereby to facilitate transfer of information thereamong. Each router node makes use of routing information that identifies, inter alia, addresses and address ranges for which it is responsible, that the respective router node uses in routing a message packet that it receives. Each router node, through a negotiation operation with other router nodes, attempts to aggregate addresses for which it is responsible into one or more address ranges which do not overlap with addresses for which the other router nodes are responsible, and provides the address range(s), along with addresses for which it is responsible which could not be so aggregated, to the other router nodes for use as their routing information.

Since each router node determines its respective address ranges through negotiations with other router nodes, router nodes can be readily be added to the network without requiring, for example, a network administrator to manually adjust the routing information for each of the other router nodes. In addition, addresses can be easily assigned on a dynamic basis, since the router nodes can easily determine appropriate address ranges to provide to other router nodes for use in connection with their routing information.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
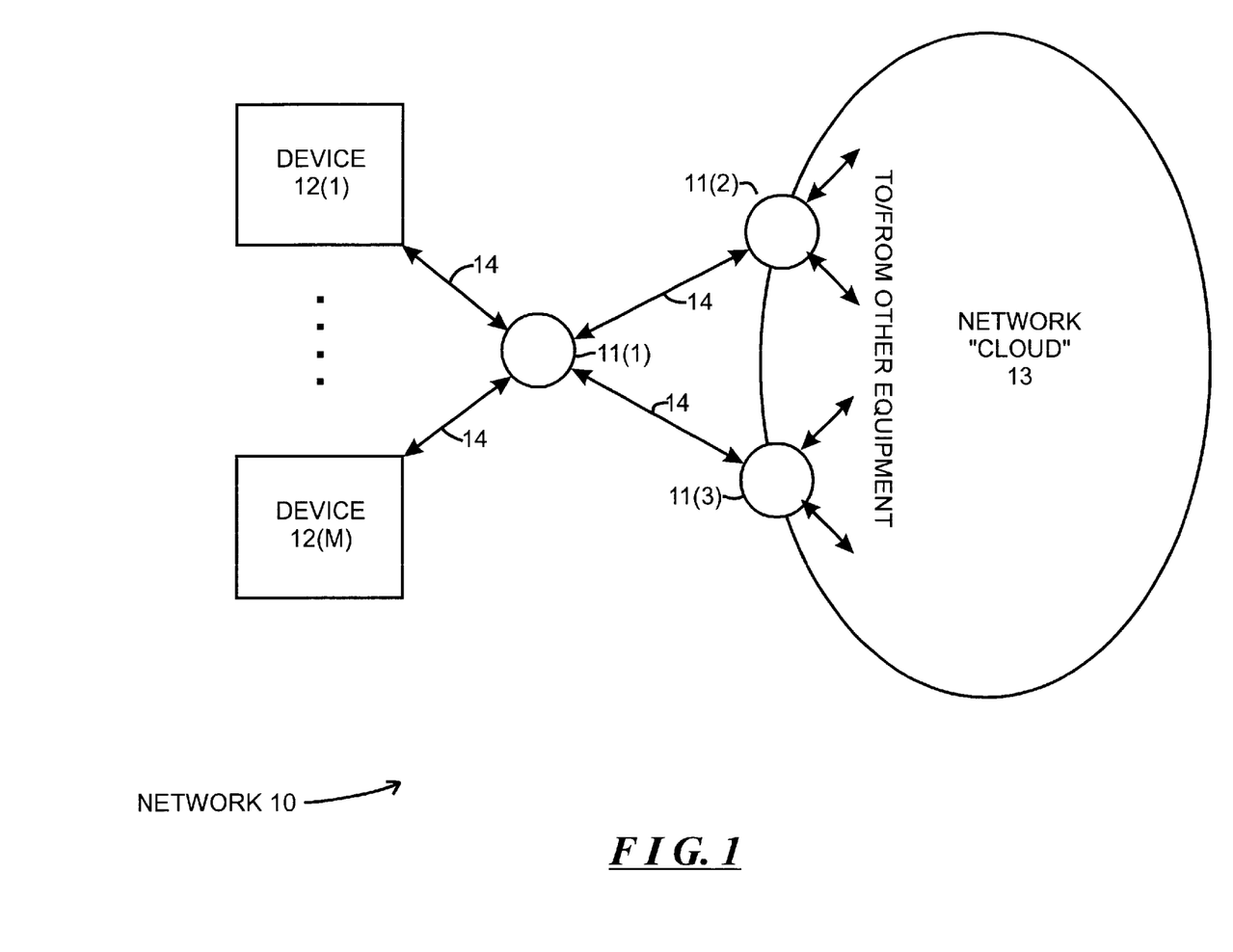
FIG. 1 is a functional block diagram of a network including an arrangement for facilitating determination by router nodes in a network of ranges of addresses for which each router node is responsible, constructed in accordance with the invention.

FIG. 1 is a functional block diagram of a network 10 including an arrangement for facilitating determination by router nodes in a network of ranges of addresses for which each router node is responsible, constructed in accordance with the invention. With reference to FIG. 1, network 10 includes a plurality of regions 10(1) through 10(N) (generally identified by reference numeral 10(n)), each of which includes at least one inter-region router node 11(n) and one or more devices 12(n)(1) through 12(n)(M) (generally identified by reference numeral 12(n)(m). The devices 12(n)(m) may be any types of devices which may be connected into a digital data network, including, but not limited to computers, information storage devices such as disk and tape devices, network resources such as hardcopy output devices, interfaces to other networks such as the public switched telephony network, and a myriad of other types of devices that can be advantageously connected in a network. The inter-region router nodes 11(n), along with other router nodes (not shown) which may be provided in the respective regions 10(n) of the network 10, are connected to each other and to respective devices 12(n)(m) over communication links to facilitate the transfer of message packets among the devices 12(n)(m), thereby to facilitate the transfer of information thereamong. Devices 12(n)(m) may be assigned to regions 10(n) in any convenient manner, including, for example, geographical proximity to one another or to an inter-region router node 11(n). At least some of the devices, as source devices 12(n)($m_S$), generate message packets for transfer to others of the devices, as destination devices 12(n)($m_D$), with at least some of the devices being operable both as source devices and as destination devices. As is conventional, each of the devices 12(n)(m) which operates as a destination device is identified by a unique address, and each message packet includes a header portion and an information payload portion. The header portion includes a destination address which identifies the device or devices that are to receive the message packet as the respective destination device 12(n)($m_D$).

After a device 12(n)(m), operating as a source device 12(n)($m_S$), generates a message packet, it transfers the message packet to the router node connected thereto. The router node, after receiving a message packet, determines from the destination address in the header portion one or more of the communication links connected thereto over which it (that is, the router node) is to transfer the message packet, and transfers the message packet over the identified communication link(s). If a communication link over which the router node transfers the message packet is connected to a device 12(n)(m), that device, as a destination device 12(n)($m_D$), receives the message packet and processes the information contained in the information payload portion.

On the other hand, if the communication link over which the router node 11($n_1$) transfers the message packet is connected to another router node 11($n_2$), that router node 11($n_2$) receives the message packet and performs operations similar to those described above in connection with router node 11($n_1$) These operations are repeated for all router nodes along the path or paths, to the destination device(s) 12(n)($m_D$) which is (are) to receive the message packet. If the source device 12(n')(mS) is in one region, identified by reference numeral 10(n'), and a destination device 12(n") (mD) is in another region 10(n"), the message packet will be transferred within region 10(n') to. the inter-region router node 11(n'), which, in turn, will transfer the message packet to the inter-region router node 11(n") of the region 10(n") containing the destination device 12(n")(mD). After the inter-region router node 11(n") has received the message packet, it will forward the message packet along the path toward the destination device 12(n")(mD). Each router node, in its message packet transfer operations, makes use of routing information that identifies the path or paths over which it is to transmit a message packet which contains the respective address as a destination address. Specifically, the inter-region router node 11(n') of the region containing the source device 12(n')(mS) makes use of routing information that identifies, for each possible destination address which necessitates an inter-region message packet transfer, the particular inter-region router node 11(n"),11(n'"), . . . (n'≠n", n'", . . . ) to which a message packet containing the destination address is to be transferred.

Router nodes and other components in the network, including the inter-region router nodes 11(n), may also operate as sources and destinations for message packets. In that connection, they will also be identified by addresses in a manner similar to devices 12(n)(m). In addition, they will, as sources, generate message packets for transmission, and, as destinations, receive message packets in a manner similar to devices 12(n)(m) as described above.

Figure 2:
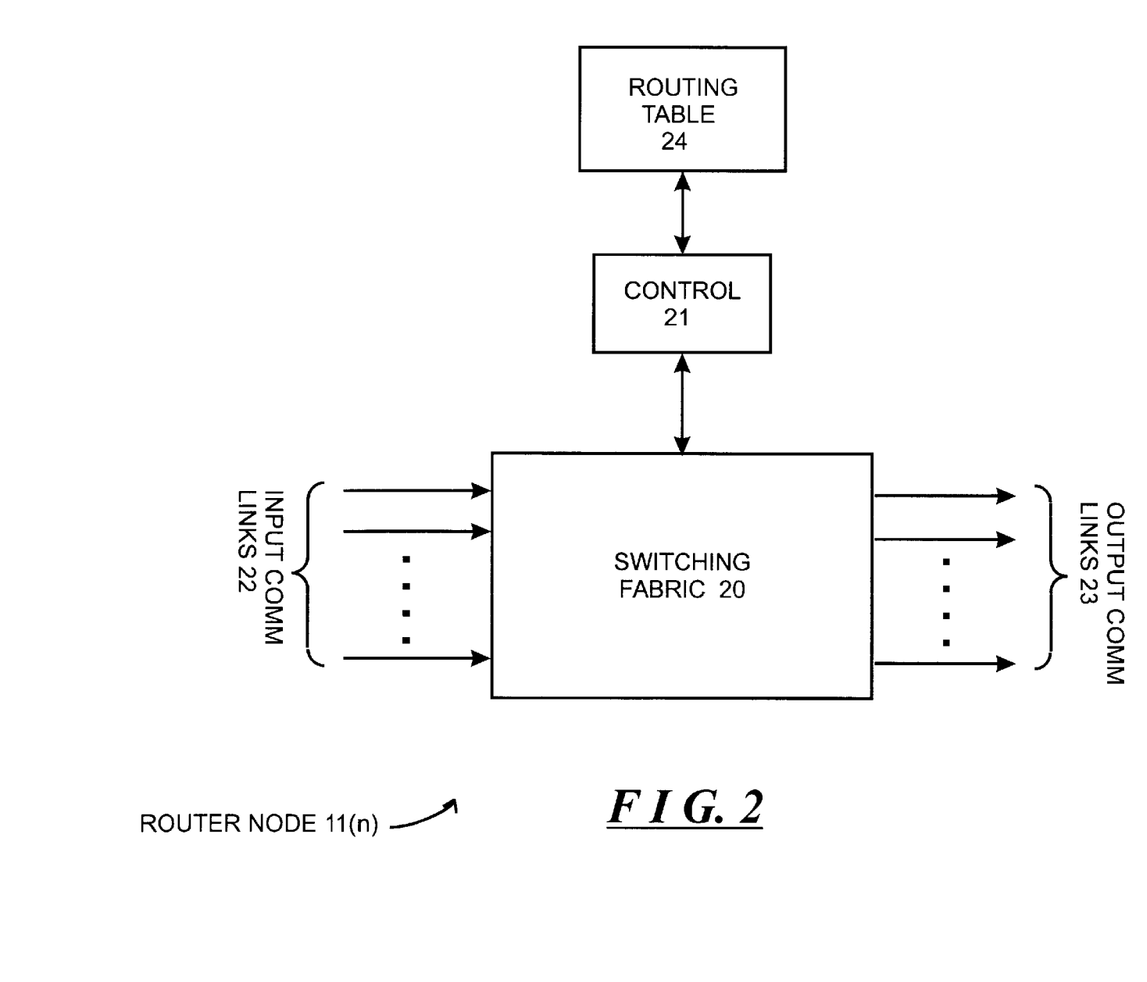
FIG. 2 is a functional block diagram of a router node useful in the network depicted in FIG. 1.

FIG. 2 depicts a functional block diagram of an inter-region router node 11(n) useful in the network 10 depicted in FIG. 1. With reference to FIG. 2, the router node 11(n) includes a switching fabric 20 and a control module 21. The switching fabric 20 is connected to receive message packets from other router nodes 11(n') (n'≠n) or devices 12(n)(m) connected thereto over respective input communication links 22. Under control of the control module 21, the switching fabric 20 switches each message packet onto a respective one or ones of a plurality of output communication links 23. Generally, each communication link connecting the router node 11(n) and either another router node 11(n') or a device 12(n)(m) will include at least one of the input communication links 22 and one of the output communication links 23 thereby to provide a bidirectional connection between the router node 11(n), on the one hand, and the other router node 11(n') or device 12(n)(m), on the other hand.

In determining the particular one or ones of the output communication links 23 over which a particular message packet is to be transmitted, the control module 21 makes use of routing information stored in a routing table 24. Because of the potentially large number of addresses for which the routing table 24 may need to store routing information, and in accordance with the invention, the routing table 24 stores the routing information in entries (not separately shown) each of which may be associated with either one address or a range of addresses, with each address or address range also identifying the inter-region router node to which message packets containing the respective address as a destination address, and perhaps the output communication link or links over which message packets are to be transmitted. If a plurality of contiguous addresses or address ranges identify the same one or more of the inter-region router node(s), the entries in the routing table 24 can be combined in one entry.

Each inter-region router node 11(n) broadcasts address information message packets over the network to the other inter-region router nodes 11(n'), 11(n''), . . . (n≠n', n'', . . . ) as to the addresses for which it is responsible, which information the other inter-region router nodes 11(n'), 11(n''), . . . can use in generating the routing information for their respective routing table 24. An inter-region router node 11(n) is responsible for an address if the other inter-region router nodes 11(n'), 11(n''), . . . are to transmit message packets having that address as a destination address to the respective inter-region router node 11(n). This may occur if, for example, a device, router node or other component having that address is in the region 10(n) with for which the router node 11(n) operates as inter-region router node. Preferably, each inter-region router node 11(n) provides the information to the other inter-region router nodes in the form of address ranges in which addresses for which the respective inter-region router node 11(n) is responsible. A problem arises, however, if two inter-region router nodes, for example, router nodes 11(n') and 11(n''), identify overlapping address ranges, or if one router node 11(n') identifies one or more individual addresses which overlap with an address range identified by another router node 11(n'').

Figure 3:
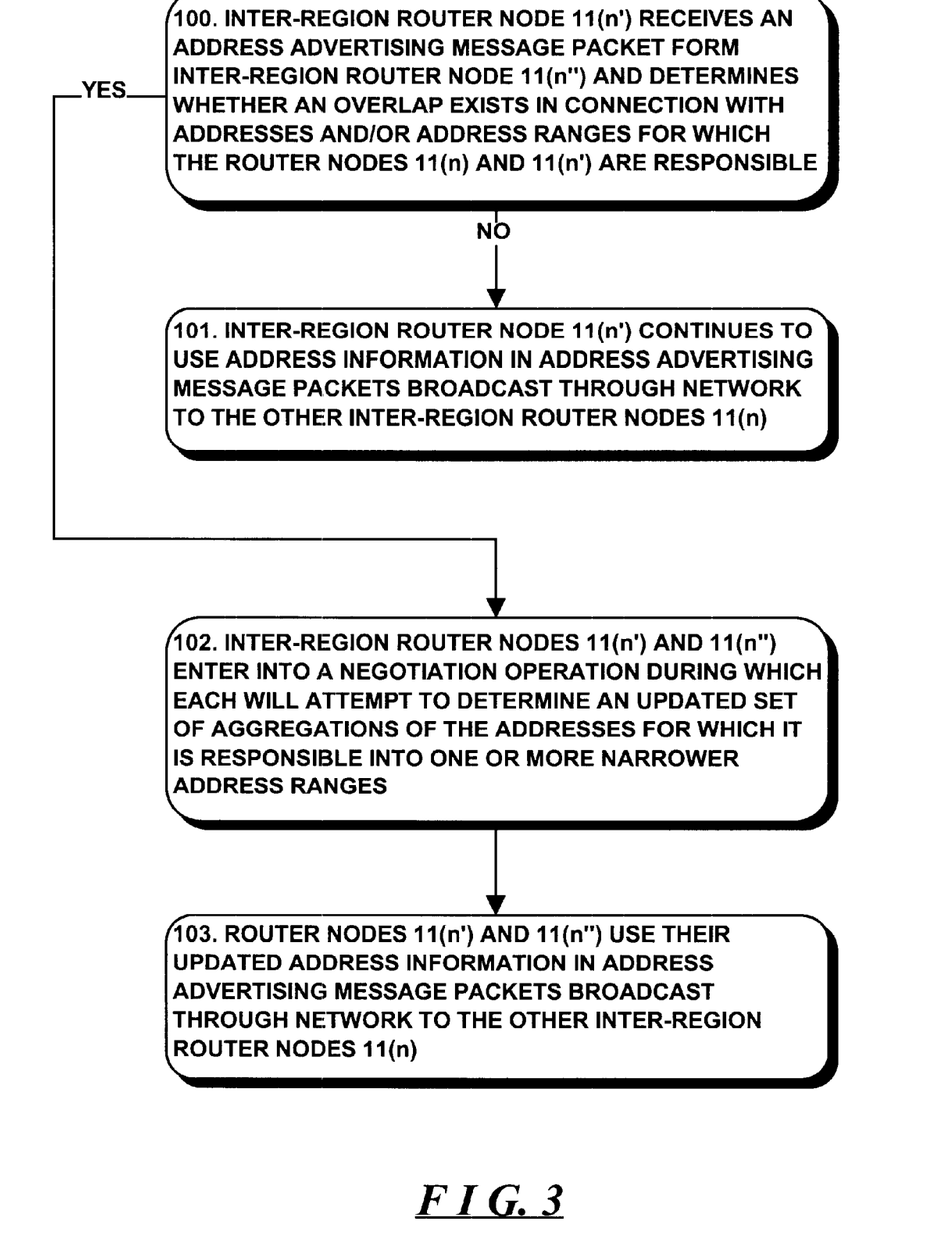
FIG. 3 is a flowchart depicting operations performed by the router node depicted in FIG. 2.

In that case, and in further accordance with the invention, the inter-region router nodes 11(n') and 11(n'') will negotiate to determine respective sets of non-overlapping aggregations of addresses which can define a new set of ranges, information which they can use in subsequent address advertising message packets for broadcast to the other inter-region router nodes 11(n). Initially, an inter-region router node, such as router node 11(n'), after receiving an address advertising message packet from the other inter-region router node 11(n''), determines whether the address advertising message packet indicates an address range associated with the other inter-region router node 11(n'') overlaps with one or more of the addresses and/or address ranges are associated with it (that is, inter-region router node 11(n')) (step 100). If the inter-region router node 11(n') makes a negative determination in step 100, that is, if it determines that the received address information message packet indicates that there is no overlap, it can continue broadcasting address advertising message packets which identify the same addresses or address ranges (step 101).

On the other hand, if inter-region router node 11(n') makes a positive determination in step 100, that is, if it determines that an overlap exists between its addresses and address ranges and the addresses and address ranges in the address advertising message packet received from the inter-region router node 11(n''), it will enter into a negotiation operation with the router node 11(n'') during which each router node 11(n') and 11(n''), using one or more address negotiation packets, will attempt to determine respective updated sets of aggregations of the addresses for which each is responsible into one or more narrower address ranges (step 102). Several methodologies utilized by the router nodes 11(n') and 11(n'') during the negotiation operation will be described below. Following the negotiation operation, the router nodes 11(n') and 11(n'') can use their updated address and address range information in address advertising message packets which they broadcast to the other inter-region router nodes 11(n) (step 103).

In the operations described above in connection with steps 100 through 103, each inter-region router node 11(n'), 11(n'') may identify respective sets of addresses for which each is responsible as one or more ranges. That is, if, for example, inter-region router node 11(n') is responsible for a set of either unicast or multicast addresses $A_{n',1} < A_{n',2} < A_{n',3} < \ldots < A_{n',Dn'}$, it (that is, the inter-region router node 11(n')) will, in its address advertising message packets and address negotiation packets, identify the range by identifying the endpoints $A_{n',1}$ and $A_{n,Dn'}$, thereby indicating it as being responsible for the address range $[A_{n',1}, A_{n',Dn'}]$, where "[x, y]" refers to the series of all possible addresses between "x" and "y," including the endpoints "x" and "y." Similarly, if inter-region router node 11(n'') is responsible for a set of either unicast or multicast addresses $A_{n'',1} < A_{n'',2} < \ldots < A_{n'',Dn''}$, it (that is the inter-region router node 11(n'')) will, in its address advertising message packets and address negotiation packets, identify the range by identifying the endpoints $A_{n'',1}$ and $A_{n'',Dn''}$, thereby indicating it as being responsible for the address range $[A_{n'',1}, A_{n'',Dn''}]$. It will be appreciated that the inter-region router node 11(n'), 11(n'') need not be responsible for all addresses in the respective range, but the address range that is initially transmitted will include at least some of the addresses in the range for which it (that is, inter-region router node 11(n'), 11(n'')) is responsible. It will be further appreciated that the address range may encompass the entire range of addresses for which inter-region router node 11(n'), 11(n'') is responsible, or, alternatively, only a portion of the entire range.

As noted above, if an inter-region router node 11(n') receives an address negotiation packet from another inter-region router node 11(n'') which contains an address range that overlaps with its (that is, inter-region router node 11(n'n)'s) address range, the inter-region router node 11(n') will perform a negotiation operation with the inter-region router node 11(n'') to determine whether it can aggregate the individual addresses in the address range for which it is responsible into one or more narrower address ranges. In that operation, the inter-region router node 11(n') can use one or more of several methodologies during the negotiation operation. In one methodology, if for example, the inter-region router node 11(n') receives an address negotiation packet from inter-region router node 11(n'') which contains addresses $A_{n'',1}$ and $A_{n'',Dn''}$, indicating an address range of $[A_{n'',1}, A_{n'',Dn''}]$, which overlaps with its (that is, inter-region router node 11(n')'s) initial address range:

(A)(i) if the entire address range $[A_{n'',1}, A_{n'',Dn''}]$ in the address negotiation packet from inter-region router node 11(n'') falls between two successive addresses $A_{n',a}$ and $A_{n',a+1}$ (where $A_{n',1} \leq A_{n',a} < A_{n',a+1} \leq A_{n',Dn'}$) in the address range $[A_{n',1}, A_{n',Dn'}]$ for which inter-region router node 11(n') is responsible, it (that is, inter-region router node 11(n')) will divide its address range $[A_{n',1}, A_{n',Dn'}]$ into two ranges $[A_{n',1}, A_{n',a}]$ and $[A_{n',a+1}, A_{n',Dn'}]$ (where either range may consist of a single address $A_{n',1}$ or $A_{n',Dn'}$), and transmit an address negotiation packet to inter-region router node 11(n'') to notify it accordingly;

(A)(ii) if the address range $[A_{n'',1}, A_{n'',Dn''}]$ in the address negotiation packet from inter-region router node 11(n'') falls between two non-successive addresses $A_{n',a}$, $A_{n',a+1}, \ldots A_{n',k}$, with, for example, only addresses $A_{n',a+1}, \ldots A_{n',k-1}$ falling in the address range $[A_{n'',1}, A_{n'',Dn''}]$, then the inter-region router node 11(n') will divide its initial address range $[A_{n',1}, A_{n',Dn'}]$ into two address ranges $[A_{n',1}, A_{n',a}]$ and $[A_{n',k}, A_{n',Dn'}]$ and a plurality of individual addresses $A_{n',a+1}, \ldots, A_{n'k-1}$ and transmit an address negotiation packet to inter-region router node 11(n'') to notify it accordingly;

(A)(iii) if the address range $[A_{n'',1}, A_{n'',Dn''}]$ in the address negotiation packet from inter-region router node 11(n'') overlaps the lower end of the address range $[A_{n',1}, A_{n',Dn'}]$, with, for example, addresses $A_{n',1} < A_{n',2} < \ldots < A_{n',a}$ falling in the address range $[A_{n'',1}, A_{n'',Dn''}]$, then the inter-region router node 11(n') will divide its initial address range $[A_{n',1}, A_{n',Dn'}]$ into one address range $[A_{n',a30\ 1}, A_{n'Dn'}]$, where $A_{,a+1}$ is the next address for which inter-region router node 11(n') is responsible after address $A_{n',a}$ in the address range $[A_{n',1}, A_{n',Dn'}]$ and a plurality of individual addresses $A_{n',1}$, $A_{n',2}, \ldots, A_{n',a}$ and transmit an address negotiation packet to inter-region router node 11(n'') to notify it accordingly, and similarly, (A)(iv) if the address range $[A_{n'',1}, A_{n'',Dn''}]$ in the address negotiation packet from inter-region router node 11(n'') overlaps the upper end of the address range $[A_{n',1}, A_{n',Dn'}]$, with, for example, only addresses $A_{n',k} < A_{n',k+1} < \ldots < A_{n',Dn'}$, falling in the address range $[A_{n'',1}, A_{n'',Dn''}]$, then the inter-region router node will divide its initial address range $[A_{n',1}, A_{n',Dn'}]$ into one address range $[A_{n',1}, A_{n',k-1}]0$, where $A_{n',k-1}$ is the next preceding address for which inter-region router node 11(n') is responsible before address $A_{n',k}$ in the address range $[A_{n',1}, A_{n',Dn'}]$, and individual addresses $A_{n',k}$, $A_{n',k+1}, \ldots, A_{n',Dn'}$, and transmit an address negotiation packet to inter-region router node 11(n'') to notify it accordingly; but (A)(v) if the address range $[A_{n'',1}, A_{n'',Dn''}]$ in the address negotiation packet from inter-region router node 11(n'') completely encompasses the address range $[A_{n',1}, A_{n',Dn'}]$, that is, $A_{n'',1} < A_{n',1} < A_{n',Dn'} < A_{n'',Dn''}$, then the inter-region router node 11(n'), in its subsequent address negotiation packets, will use the individual addresses $A_{n',1}, \ldots, A_{n',Dn'}$ in its address negotiation packet to inter-region router node 11(n'') to notify it (that is, inter-region router node 11(n'')) of the individual addresses $A_{n',1}, \ldots, A_{n',Dn'}$.

It will be appreciated that, if the address negotiation packet received by inter-region router node 11(n') from inter-region router node 11(n'') does not contain any addresses or address ranges which overlap with the address range $[A_{n',1}, A_{n',Dn'}]$ containing addresses for which it (that is, inter-region router node 11(n')) is responsible, the inter-region router node 11(n') can continue using the single address range $[A_{n',1}, A_{n',Dn'}]$ as the address information that it broadcasts in the address advertising message packets that it broadcasts to the other inter-region router nodes. The inter-region router node 11(n') need only perform operations described above in connection with paragraphs (A)(i) through (A)(v) to determine narrower address range(s) and/or individual addresses for use in subsequent address negotiation packets if it receives an address negotiation packet from inter-region router node 11(n'') which contains an address or address range which overlaps with the address range for which inter-region router node 11(n') is responsible.

Inter-region router node 11(n'') will perform operations similar to those described above when it receives an address negotiation packet that it receives from inter-region router node 11(n'). When the inter-region router node 11(n'') receives either an initial address negotiation packet from inter-region router node 11(n'), which includes the entire range $[A_{n',1}, A_{n',Dn'}]$ or subsequent address negotiation packet, which may include multiple address ranges, or an address range and one or more individual addresses, from the inter-region router node 11(n'), it may divide its address range in a manner similar to that described above. Thus (and with reference to the examples in paragraphs (A)(i) through (A)(v) above):

(B)(i) since inter-region router node 11(n'')'s address range does not overlap with any of the address ranges $[A_{n',1}, A_{n',a}]$ or $[A_{n',b}, A_{n',Dn'}]$ in the address negotiation packet from inter-region router node 11(n'), the inter-region router node 11(n'') will continue to use the address range $[A_{n'',1}, A_{n'',Dn''}]$ as address information in the address information message packets that it broadcasts;

(B)(ii) since inter-region router node 11(n'')'s address range $[A_{n'',1}, A_{n'',Dn''}]$ overlaps with the addresses $A_{n',a+1}, \ldots, A_{n',k-1}$ in the address range for which inter-region router node 11(n') is responsible, the inter-region router node 11(n'') will divide its address range $[A_{n'',1}, A_{n'',Dn''}]$ into ranges based on those addresses $A_{n',a+1}, \ldots, A_{n',k-1}$ for use in its subsequent address negotiation packets that it transmits to inter-region router node 11(n'); thus, for example, if addresses $A_{n'',1}, \ldots, A_{n'',a}$ fall between addresses $A_{n',a}$ and $A_{n',a+1}$, the inter-region router node 11(n'') will establish a range $[A_{n'',1}, A_{n'',a}]$ and similarly for the remaining addresses $A_{n'',b'}, \ldots, A_{n'',Dn''}$ in the address range for which inter-region router node 11(n'') is responsible;

(B)(iii) since inter-region router node 11(n'')'s address range $[A_{n'',1}, A_{n'',Dn''}]$ overlaps with addresses $A_{n',1}$, $A_{n',2}, \ldots, A_{n',a}$ in the address range for which inter-region router node 11(n') is responsible, if address $A_{n'',k}$ is the first address larger than address $A_{n',1}$ for which inter-region router node 11(n'') is responsible (that is, $A_{n'',k-1} < A_{n',1} < A_{n'',k}$), the inter-region router node 11(n'') will divide its address range $[A_{n'',1}, A_{n'',Dn''}]$ into a range $[A_{n'',1}, A_{n'',k-1}]$ and one or more ranges based on inter-region router node 11(n')'s addresses $A_{n',1}, \ldots, A_{n'Dn'}$ for use in its subsequent address negotiation packets transmitted to inter-region router node 11(n'); thus, for example, if addresses $A_{n'',k'}, \ldots, A_{n'',1}$ fall between addresses $A_{n',1}$ and $A_{n',2}$, the inter-region router node 11(n'') will establish another range $[A_{n'',k'}, A_{n'',1'}]$, and similarly for the remaining addresses $A_{n'',1'+1}, \ldots, A_{n'',Dn''}$ in the address range for which inter-region router node 11(n'') is responsible;

(B)(iv) since inter-region router node 11(n'')'s address range $[A_{n'',1}, A_{n'',Dn''}]$ overlaps with addresses $A_{n',k}$, $A_{n',k+1}, \ldots, A_{n',Dn'}$ in the address range for which inter-region router node 11(n') is responsible, if address $A_{n'',k}$ is the first address greater than address $A_{n',Dn'}$ for which inter-region router node 11(n'') is responsible (that is, $A_{n'',k} < A_{n',Dn} < A_{n'',k+1}$), the inter-region router node 11(n'') will divide its address range $[A_{n'',1}, A_{n'',Dn''}]$ into a range $[A_{n'',k+1}, A_{n'',Dn''}]$ and one or more ranges based on inter-region router node 11(n')'s addresses $A_{n',1}, A_{,Dn'}$ for use in its subsequent address negotiation packets transmitted to inter-region router node 11(n'); thus, for example, if addresses $A_{n'',a'}, \ldots, A_{n'',k'}$ fall between addresses $A_{n',Dn'-1}$ and $A_{n',Dn'}$, the inter-region router node 11(n″) will establish another range [$A_{n″,a}'$, $A_{n″,k'}$], and similarly for the remaining addresses $A_{n″,1}$, . . . , $A_{n″,k-1}$ in the address range for which inter-region router node 11(n″) is responsible; and (B)(v) since the inter-region router node 11(n″)'s address range [$A_{n″,1},A_{n″,Dn″}$] completely encompasses addresses [$A_{n',1},A_{n',Dn'}$] for which inter-region router node 11(n') is responsible, the inter-region router node 11(n″) will perform operations similar to those described above in connection with items (A)(i) or (A)(ii), depending on whether (in the case of item (A)(i)) or not (in the case of item (A)(ii)) the address range [$A_{n',1},A_{n',Dn'}$] for which inter-region router node 11(n') is responsible falls between two consecutive addresses $A_{n″,a}'$ and $A_{n″,b}$ for which inter-region router node 11(n″) is responsible.

After the inter-region router node 11(n″) receives the subsequent address negotiation packet from the inter-region router node 11(n″), with the updated address and address range information, it (that is, inter-region router node 11(n')) will revise its address ranges based on the updated address and address range information. In that operation, the inter-region router node 11(n') will determine whether it can aggregate series of individual addresses for which it is responsible into one or more ranges for use in its subsequent address negotiation packets. For example, if (i) inter-region router node 11(n') had, after receiving the first address negotiation packet from inter-region router node 11(n″) (reference paragraphs (A)(i) through A(v) above), determined that a series of addresses $A_{n',a}$, . . . , $A_{n',k}$ for which it is responsible overlap with the address range specified in that first address negotiation packet, and (ii) if inter-region router node 11(n') received a subsequent address negotiation packet from inter-region router node 11(n″) identifying, for example, a single address $A_{n″,k'}$ for which it (that is, inter-region router node 11(n″)) is responsible, between addresses $A_{n',a}$ and $A_{n',k'}$ (illustratively, address $A_{n″,k'}$ falls between $A_{n',c}$ and $A_{n',c+1}$, that is, $A_{n',a}<A_{n',c}<A_{n″,k'1}<A_{n',c+1}<A_{n',k}$), then inter-region router node 11(n') would aggregate addresses $A_{n',a}$, . . . ,$A_{n',c}$ into one range [$A_{n',a},A_{n',c}$] and addresses $A_{n',c+1}$, . . . ,$A_{n',k}$ into another range [$_{n',c+1},A_{n',k}$], and would use those narrower ranges, along with other narrower ranges and individual addresses which it determined in connection with operations described above in connection with paragraphs (A)(i) through A(v), as necessary in address negotiation packets which it subsequently transmits to inter-region router node 11(n″).

Figure 4A:
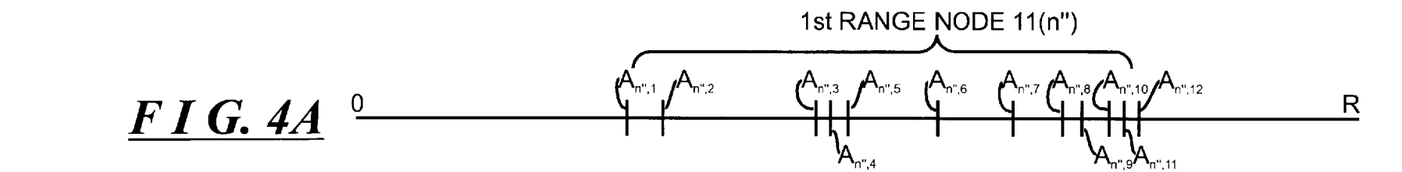
FIGS. 4A through 4D are diagrams useful in understanding the operation of the router nodes in determining ranges of addresses for which respective ones are responsible.
Figure 4B:
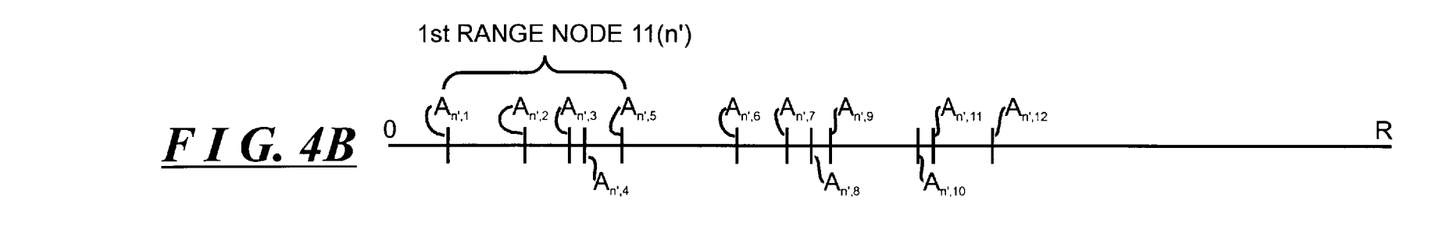

Operations described above will be illustrated in connection with a specific example depicted in FIGS. 4A through 4D. Those FIGS. 4A through 4D depict addresses $A_{n',1}$ through $A_{n',12}$ and $A_{n″,1}$ through $A_{n″,12}$ for which the respective inter-region router nodes 11(N') and 11(n″) are responsible, in a range of possible addresses extending from low-end address, illustratively zero, through a predetermined address "R." In the illustrative example, both inter-region router nodes are responsible for twelve addresses, although it will be appreciated that the number of addresses for which each is responsible may differ, and may also differ from twelve. In any case, it will be assumed that inter-region router node 11(n') initially receives a address negotiation message packet from inter-region router node 11(n″) indicating the range [$A_{n″,1},A_{n″,12}$], corresponding to the entire range for which it (that is, the inter-region router node 11(n″)) is responsible (FIG. 4A). As shown in FIG. 4B, that range overlaps the high end of the address range for which inter-region router node 11(n') is responsible, specifically starting with address $A_{n',6}$, as described above in paragraph A(iv), the router node 11(n') will generate an address negotiation message packet that includes the range [$A_{n',1},A_{n',5}$] and the individual addresses $A_{n',6}$ through $A_{n',12}$.

Figure 4C:
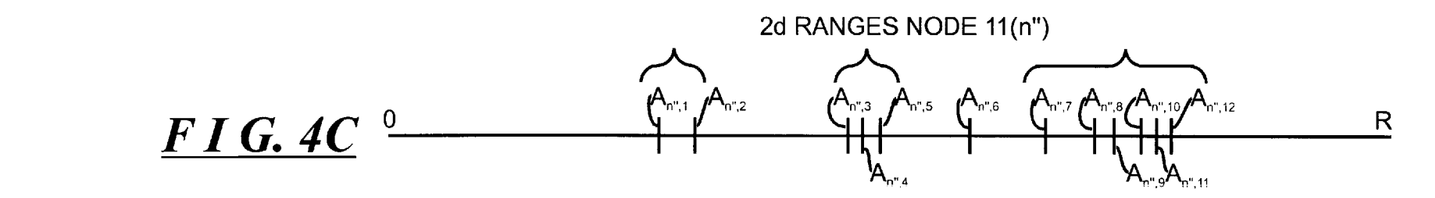

When the inter-region router node 11(n″) receives the address negotiation message packet from the inter-region router node 11(n'), since the packet identifies the individual addresses $A_{n',6}$ through $A_{n',12}$ for which inter-region router node 11(n') is responsible, it (that is, inter-region router node 11(n″) will be able to divide its range [$A_{n″,1},A_{n″,12}$] into appropriate sub-ranges, as indicated in FIG. 4C. In that operation, since addresses $A_{n″,1}$ and $A_{n″,1}$ fall between addresses $A_{n',5}$ and $A_{n',6}$, the inter-region router node 11(n″) will be able to transmit the range [$A_{n″,1},A_{n″,2}$] in its next address negotiation message packet; alternatively, since the address range only includes the two addresses, the inter-region router node 11(n″) may just advertise the individual addresses. Similarly, since the three addresses $A_{n″,3}$ through $A_{n″,5}$ fall between consecutive addresses $A_{n',9}$ and $A_{n',10}$ for which inter-region region router node 11(n') is responsible, the inter-region router node 11(n″) will be able to transmit the range [$A_{n″,3},A_{n″,5}$] in its next address negotiation message packet, and since the six addresses $A_{n″,7}$ through $A_{n″,12}$ fall above the address range for which inter-region router node 11(n') is responsible, the inter-region router node 11(n″) will be able to transmit the range [$A_{n″,7},A_{n″,12}$] in its next address negotiation message packet. The inter-region router node 11(n″) will also include the individual address $A_{n″,6}$, which falls between two addresses $A_{n',11}$ and $A_{n',12}$ for which inter-region router node 11(n') is responsible, in the address negotiation message packet.

Figure 4D:
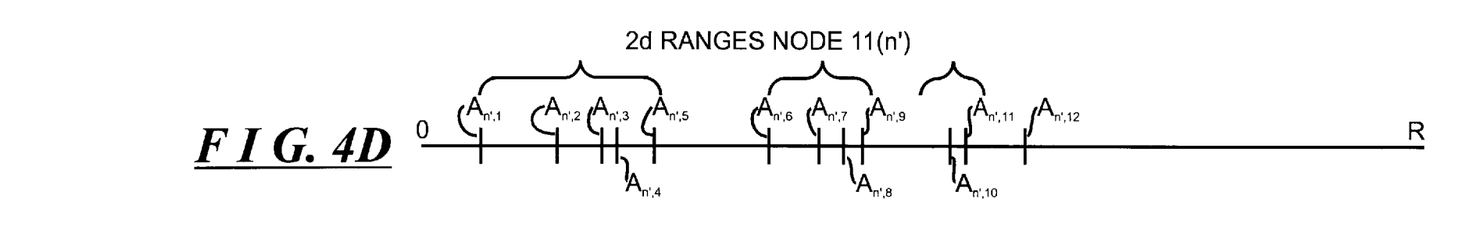

When the inter-region router node 11(n') receives the address negotiation message packet from the inter-region router node 11(n″), since the packet identifies the three ranges [$A_{n″,1},A_{n″,2}$], [$A_{n″,3},A_{n″,5}$], and [$A_{n″,7},A_{n″,12}$] along with the individual address $A_{n″,6}$, the inter-region router node (which falls between two consecutive addresses $A_{n″,6}$ and $A_{n″,7}$ for which inter-region router node 11(n″) is responsible) and [$A_{n',10},A_{n',11}$] (which falls between two consecutive addresses $A_{n″,5}$ and $A_{n″,6}$ for which inter-region router node 11(n″) is responsible) which, along with the initial range [$A_{n',1},A_{n',5}$] and individual address $A_{n',12}$ will be transmitted by inter-region router node 11(n') in its address negotiation message packet (FIG. 4D). At that point, there will be no overlapping address ranges for which inter-region router nodes 11(n') and 11(n″) are responsible, and they may thereafter use the ranges and individual addresses in address advertising message packets they broadcast thereafter.

The inter-region router nodes 11(n) and 11(n″) can use the updated address information determined during the address negotiation operation in after they determine it (that is, the updated address information) during the negotiation process. Alternatively, one or both of the inter-region router nodes 11(n') or 11(n″) can delay using the updated address information, to, for example, determine whether it (that is, the updated address information) will need to be further updated in connection with address range overlaps with other inter-region router nodes 11(n'″), 11(n″″), . . . in the network 10. If the inter-region router node 11(n') and/or 11(n″) delays using the updated address information, the number of times or the rate at which the other inter-region router nodes 11(n) may need to update their routing information may be reduced. Similarly, each inter-region router node 11(n) may delay updating the routing information for some delay period after it initially receives updated routing information from a neighboring inter-region router node in case it receives further updated address information within a delay period, which can also reduce the number of times, or the rate at which, it updates the address information.

One problem that can arise in connection with the negotiation methodology as described above is that the address range and address information transferred between the inter-region router nodes 11(n') and 11(n") may become quite large if, in particular, they determine that a large number of, for example, individual addresses are in the overlap portion of the address range before re-aggregation, which may necessitate large address negotiation packets, or a number of such address negotiation packets to be transmitted to transfer all of the information between the inter-region router nodes 11(n') and 11(n"). To accommodate that, in a second methodology, the inter-region router nodes 11(n') and 11(n") will initially exchange address negotiation packets to determine whether their address ranges $[A_{n',1}, A_{n',Dn'}]$ and $[A_{n'',1}, A_{n'',Dn''}]$ overlaps. If so, the inter-region router nodes 11(n') and 11(n") will divide the overlapping regions into a plurality of segments and determine whether, for each segment, both inter-region router nodes 11(n') and 11(n") have at least one address for which they are responsible in the respective segment. For those segments for which both inter-region router nodes 11(n') and 11(n") have at least one address for which they are responsible, in a subsequent iteration the inter-region router nodes will repeat the operations in connection with such segments, subdividing them into increasingly finer segments. These operations are repeated until there are no segments in which both inter-region router nodes 11(n') and 11(n") have at least one address for which they are responsible. Each inter-region router node 11(n') and 11(n") can determine address ranges for which it is responsible by determining series of addresses for which the respective inter-region router node 11(n') or 11(n") is responsible which are not interrupted by segments which contain at least one address for which the other inter-region router node 11(n") or 11(n') is responsible. Thereafter, each inter-region router node 11(n') and 11(n") can broadcast address negotiation packets to other inter-region router nodes in the network 10 containing such address ranges and any individual addresses which could not be aggregated into a range, for use in their routing tables 24.

More specifically, assuming, for example, that the lower end of the address range $[A_{n',1}, A_{n',Dn'}]$ containing addresses for which inter-region router node 11(n') is responsible, overlaps with the upper end of the address range $[_{n'',1}, A_{n'',Dn''}]$ containing addresses for which inter-region router node 11(n") is responsible, in the initial iteration, the inter-region router nodes 11(n') and 11(n") will divide the address range $[A_{n',1}, A_{n'',Dn''}]$ into $S_1$ segments $Seg^1(1), \ldots, Seg^1(S_1)$(generally, "$Seg^1(s_1)$"), and establish a respective bit maps comprising a series of bits $B'(1)$ through $B'(S_1)$ (generally, $B'(s_1)$) and $B''(1)$ through $B''(S_1)$ (generally, $B''(s_1)$), with each bit $B'(s_1)$ and $B''(s_1)$ being associated with the correspondingly-indexed segment $Seg^1(s_1)$. Thus, successive segments may be defined by $[A_{n'}, A_a)$ (associated with bits $B'(1)$ and $B''(1))$, $[A_a+1, A_b)$ associated with bits $B'(2)$ and $B''(2))$, ..., $[A_k, A_{n'',Dn''}]$ (associated with bits $B'(S_1)$ and $B''(S_1)$), with [x,y) representing a segment that includes endpoint "x" and excludes endpoint "y." Address "$A_a$" represents an address value which is on the order of $$\frac{1}{S_1}(A_{n'',Dn''} - A_{n',1}) + A_{n',1}$$

and "$A_a+1$" represents the next possible address value in the address range after address $A_a$, that is, for example, $$\frac{1}{S_1}(A_{n'',Dn''} - A_{n',1}) + A_{n',1} + 1.$$

Similarly, address $A_b$ represents an address value on the order of $$\frac{2}{S_1}(A_{n'',Dn''} - A_{n',1}) + A_{n',1},$$

and address $A_k$ represents an address value on the order of $$\frac{S_1-1}{S_1}(A_{n'',Dn''} - A_{n',1}) + A_{n',1} + 1.$$

It will be appreciated that address values $A_a$, $A_a+1$, $A_b$, ... $A_k$ may, but need not, correspond to actual addresses for which either inter-region router node 11(n') or inter-region router node 11(n") is responsible in the address range. If a segment $Seg^1(s_1')$ contains an address for which inter-region router node 11(n') is responsible, it will set the bit $B'(s_1')$ in its bit map that it transmits to the other inter-region router node 11(n"). On the other hand, if a segment $Seg^1(s_1")$ does not contain an address for which inter-region router node 11(n') is responsible, the bit $B'(s_1")$ in the bit map that the inter-region router node 11(n') transmits to the other inter-region router node 11(n") will be clear. Similarly, if a segment $Seg^1(s_1''')$ contains an address for which inter-region router node 11(n") is responsible, it will set the bit $B''(s_1''')$ in its bit map that it transmits to the other inter-region router node 11(n'), but if a segment $Seg^1(s_1''')$ does not contain an address for which inter-region router node 11(n") is responsible, the bit $B'(s_1''')$ in the bit map that the inter-region router node 11(n") transmits to the other inter-region router node 11(n") will be clear.

When inter-region router node 11(n') receives the address negotiation packet containing the bit map from the other inter-region router node 11(n"), using the bit map in the address negotiation packet it will determine which, if any, of the addresses for which it is responsible in the overlapping range $[A_{n',1}, A_{n'',Dn''}]$ falls in a segment $Seg^1(s_1)$ for which a bit $B''(s_1)$ in the bit map is set. It will be appreciated that, if a bit $B''(s^1)$ in the bit map received from inter-region router node 11(n") is set, inter-region router node 11(n") is responsible for at least one address in the associated segment $Seg^1(s^1)$. On the other hand, if a bit $B''(s_1')$ in the bit map received from the inter-region router node 11(n") is not set, inter-region router node 11(n") is not responsible for any of the addresses in the associated segment $Seg^1(s_1')$. If the inter-region router node 11(n') determines that none of the addresses for which it is responsible in the overlapping range is in a segment $Seg^1(s_1)$ for which the bit $B''(s_1)$ is set, it (that is, the inter-region router node 11(n')) can use the bits $B''(s_1)$ in the bit map received from inter-region router node 11(n") which are set, if any, to identify series of addresses for which it is responsible which can be aggregated into respective narrower address ranges.

On the other hand, if the inter-region router node 11(n') determines that an address for which it is responsible falls in a segment $Seg^1(s1)$ for which the bit $B''(s1)$ is set, it (that is, inter-region router node 11(n')) will repeat the operations described above in connection with that segment $Seg^1(s1)$, that is, it will divide the segment $Seg^1(s_1)$ into "$S_{s1,2}$" finer segments $Seg^2_{s1}(1)$ through $Seg^2_{s1}(S_{s1,2})$, establish a bit map of $S_{s1,2}$ bits $B^2_{n',s1}(1)$ through $B^2_{n',s1}(S_{s1,2})$(generally, "$B^2_{n',s1}(s_{s1,2})$"), and set the bit or bits $B^2_{n',s1}(s_{s1,2})$ in the bit map associated with the segments associated with addresses for which it (that is, inter-region router node 11(n')) is responsible. The inter-region router node 11(n') will perform these operations in connection with each segment $Seg^1(s_1)$ in which an address falls for which it is responsible and for which the associated bit $B''(s1)$ in the bit map as received from the inter-region router node 11(n'') is set, in the process generating a bit map for each such segment $Seg^1(s_1)$. Thereafter, the inter-region router node 11(n') can transmit the bit map(s) so generated in an address negotiation packet to the inter-region router node 11(n'').

The inter-region router node 11(n'') can perform similar operations when it receives the address negotiation packet containing the bit map from the inter-region router node 11(n').

These operations can continue through a series of iterations until each inter-region router node 11(n') and 11(n'') determines that no segment contains an address for which both inter-region router node 11(n') and 11(n'') is responsible. Thereafter, each inter-region router node 11(n') and 11(n''), using the identification of segments containing addresses for which the other inter-region router node 11(n'') or 11(n') is responsible, if any, identifies a series of addresses for which it (that is, inter-region router node 11(n') or 11(n'')) is responsible which can be aggregated into respective narrower address ranges, identification of which can be transmitted in address negotiation packets to other inter-region router nodes in the network. It will be appreciated that, by use of this methodology, each inter-region router node 11(n') and 11(n'') can determine the narrower address ranges that it can aggregate without actually knowing the specific addresses for which inter-region router node 11(n'') is responsible in the overlapping region.

As an alternative to use of segments as described above to identify addresses which can be aggregated into address ranges, in a third methodology, after identifying the overlapping address range $[A_{n',1}, A_{n'',Dn''}]$ the inter-region router nodes 11(n') and 11(n'') can, for example, exchange address information within the overlapping range, which each can use in aggregating addresses for which it is responsible into narrower ranges. Thus, for example, inter-region router node 11(n'') can initially transmit its next higher address above address $A_{n',1}$(for which inter-region router node 11(n') is responsible), illustratively, address $A_{n'',a}$, to the inter-region router node 11(n'), which would indicate to inter-region router node 11(n') that it can aggregate addresses, if any, between addresses $A_{n',1}$ and $A_{n'',a}$ into a range. Thereafter, the inter-region router node 11(n') can transmit its next higher address above address $A_{n'',a}$, illustratively, address $A_{n',a}$, to the inter-region router node 11(n''), which would indicate to inter-region router node 11(n'') that it can aggregate addresses, if any, between addresses $A_{n'',a}$ and $A_{n',a}$ into a narrower range. These operations can be repeated throughout the overlapping address range $[A_{n',1}, A_{n'',Dn''}]$.

Corresponding operations can be performed in either direction through the overlapping range, and, indeed, in both directions concurrently. Thus, for example, inter-region router node 11(n'') can, in its initial transmission, provide addresses $A_{n'',a}$ and $A_{n'',Dn''-1}$ (address $A_{n'',Dn''-1}$ representing the next address for which inter-region router node 11(n'') is responsible below address $A_{n'',Dn''}$) to inter-region router node 11(n'). The inter-region router node 11(n'), from the operations to identify the overlapping range, has already been notified that inter-region router node 11(n'') is responsible for address $A_{n'',Dn''}$. The inter-region router node 11(n'), in turn, will use the information to aggregate addresses, if any, for which it is responsible between addresses $A_{n',1}$ and $A_{n'',a}$ and between addresses $A_{n'',Dn''-1}$ and $A_{n'',Dn''}$ into respective ranges. Thereafter, the inter-region router node 11(n') will transmit the next higher address above address $A_{n'',a}$, illustratively, $A_{n',a}$, and the next lower address below address $A_{n'',Dn''-1}$, illustratively $A_{n',k}$, for which it is responsible, which would indicate to inter-region router node 11(n'') that it can aggregate addresses, if any, between address $A_{n'',a}$ and $A_{n',a}$ and between addresses $A_{n',k}$ and $A_{n'',Dn''-1}$ for which it (that is, inter-region router node 11(n'')) is responsible into respective ranges.

Other negotiation methodologies, including variations on the above, will be apparent to those skilled in the art. For example, if a inter-region router node is responsible for a series of odd or even addresses, in an address negotiation packet it can summarize the series by identifying the endpoints and provide a flag or other indicator indicating that the series contains only odd or even addresses.

The invention provides a number of advantages. In particular, the invention provides an arrangement for enabling each inter-region router node 11(n') in the network 10 to determine, through negotiations with other inter-region router nodes 11(n''), 11(n'''), . . . , ranges comprising addresses for which it (that is, inter-region router node 11(n')) is responsible, which do not overlap with addresses for which the other inter-region router nodes 11(n''), 11(n'''), . . . are responsible, which ranges and individual addresses which the inter-region router node 11(n') determines not to be aggregated into a range, and which the inter-region router node 11(n') can provide to other inter-region router nodes for use in their routing tables. By facilitating aggregation of the addresses into one or more ranges, the amount of space in the routing tables 24 required for the address information can be reduced. And by determining the appropriate aggregation by means of negotiation operation between inter-region router nodes 11(n'), 11(n''), 11(n'''), . . . inter-region router nodes can readily be added to the network 10 and addresses can easily be assigned in a dynamic manner.

It will be appreciated that a number of modifications may be made to the network as described above and the operations performed during negotiation. For example, the inter-region router nodes may perform negotiation in manners other than described above.

In addition, in connection with the methodology described above which uses segments, although the methodology has been described in connection with equal-length segments, it will be appreciated that the segments may be of unequal length, which may be particularly useful depending on the number of bits that may be required to identify the segment endpoints.

Furthermore, it will be appreciated that, even if a inter-region router node can aggregate two or more addresses into an address range following a negotiation operation, it does not necessarily need to do so. For example, if a inter-region router node has several addresses that it could aggregate into a relatively wide range, it may determine not to perform the aggregation. On the other hand, if one inter-region router node 11(n') is responsible for only a few addresses within a range for which another inter-region router node 11(n'') is responsible for most or all of the others, if routing is performed on a most specific address match basis, it may be more efficient for a inter-region router node 11(n) to store both the range associated with inter-region router node 11(n'') and the individual addresses associated with inter-region router node 11(n').

In addition, although the inter-region router nodes 11(n) have been described as engaging in a negotiation operation on their own behalf to resolve overlaps in respective address ranges for which they are responsible, it will be appreciated that other components (not shown) may be used to perform some or all of a negotiation operation, in addition or instead of the inter-region router nodes, as proxies therefor.

Further, it will be appreciated that apparent address range overlaps may result from multiple paths being provided from a source to a particular destination. In that case, to ensure that the inter-region router nodes do not attempt to resolve the apparent overlap, the inter-region router nodes can associate, for example, domain identifiers or other constructs, in their address negotiation packets to disambiguate the ranges associated with the respective paths.

In addition, although the invention has been described in connection with disambiguating addresses and address ranges as between two or more inter-region router nodes, it will be appreciated that the invention can be used in connection with disambiguating addresses and address ranges as between other devices, and in addition can be used in connection with disambiguating individual numbers and numerical ranges as between other types of entities.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network comprising a plurality of router nodes interconnected by communication links, the router nodes being configured to route message packets thereamong, at least some of said router nodes being associated with a plurality of addresses, at least one of the router nodes being configured to engage in a negotiation operation with another of said router nodes to identify address range information comprising an aggregation of addresses for which said at least one router node is responsible, which at least one address range does not overlap with an address for which said other router node is responsible, the address range being used in connection with routing information for said at least one router node by said router nodes.

2. A network as defined in claim 1 in which said addresses include at least one unicast address.

3. A network as defined in claim 1 in which said addresses include at least one multicast address.

4. A network as defined in claim 1 in which said at least one router node includes a proxy node and a message packet switching node, the proxy node being configured to engage in said negotiation operation and the message packet switching node being configured to route message packets received thereby.

5. A network as defined in claim 1 in which said at least one router node comprises:
   A. an address information advertising module configured to generate an address negotiation packet for transmission to the other router node, the address information advertising module being configured to initially provide an address range encompassing addresses for which the at least one router node is responsible, and subsequently selectively provide updated address range information;
   B. an address information receiving module being configured to receive address negotiation packets from said other router node including address information therefor; and
   C. a negotiation module being configured to engage in the negotiation operation, in response to receipt by the address information receiving module of address information from said other router node representing an address range overlapping the address range defined by the address information in the address negotiation packet generated by the address information advertising module, to generate updated address range information for use by the address information advertising module.

6. A network as defined in claim 5 in which said negotiation module, during the negotiation operation, is configured to
   i. generate an address negotiation packet for transfer to said other router node, the address negotiation packet identifying addresses for which the at least one router node is responsible in an overlapping address region comprising the portion of the other router node's address range which overlaps with the at least one router node's address range; and
   ii. generate the updated address range information in response to receipt of an address negotiation packet received from said other router node including identification of addresses for which the other router node is responsible in the overlapping address range.

7. A network as defined in claim 6 in which said negotiation module is configured to, in generating the address negotiation packet for transfer to the other router node, include at least one address for which the at least one router node is responsible in the overlapping address range.

8. A network as defined in claim 7 in which said negotiation module is configured to, in generating at least one address negotiation packet for transfer to the other router node, include an address above the lowest address for which the other router node is responsible for which the at least one router node has been notified in the overlapping address range.

9. A network as defined in claim 8 in which said negotiation module is configured to, in each of a series of iterations, include in an address negotiation packet generated during the respective iteration an address above the lowest address for which the other router node is responsible for which the at least one router node has been notified in the overlapping address range.

10. A network as defined in claim 7 in which said negotiation module is configured to, in generating the address negotiation packet for transfer to the other router node, include an address below the highest address for which the other router node is responsible for which the at least one router node has been notified in the overlapping address range.

11. A network as defined in claim 10 in which said negotiation module is configured to, in each of a series of iterations, include in an address negotiation packet generated during the respective iteration an address below the highest address for which the other router node is responsible for which the at least one router node has been notified in the overlapping address range.

12. A network as defined in claim 7 in which said negotiation module is configured to, in generating the address negotiation packet for transfer to the other router node, include a plurality of addresses for which the at least one router node is responsible in the overlapping address range.

13. A network as defined in claim 6 in which said negotiation module is configured to, in generating the address negotiation packet for transfer to the other router node, include an indication, for each of a series of address segments in the overlapping address range, whether the at least one router node has an address for which it is responsible in the respective address segment.

14. A network as defined in claim 13 in which said negotiation module is configured to, in each of a series of iterations, in generating the address negotiation packet for transfer to the other router node, include an indication, for each of a series of address segments in the overlapping address range, whether the at least one router node has an address for which it is responsible in the respective address segment, in each iteration the negotiation module dividing each segment which contains at least one address for which both the at least one router node and the other router node are responsible into a series of finer segments and providing an indication as to whether the at least one router node has an address therein for which it is responsible.

15. A network as defined in claim 1 in which the negotiation module is configured to generate the updated address range information identifying an aggregation of a series of addresses for which it is responsible which does not include an address for which the other router node is responsible.

16. A node for use in a network, the node comprising:
A. an address information advertising module configured to generate an address negotiation packet for transmission to another node, the address information advertising module being configured to initially provide an address range encompassing addresses with which the node is associated, and subsequently selectively provide updated address range information;
B. an address information receiving module being configured to receive address negotiation packets from said other node including address information therefor; and
C. a negotiation module being configured to engage in a negotiation operation, in response to receipt by the address information receiving module of address information from said other node representing an address range overlapping the address range defined by the address information in the address negotiation packet generated by the address information advertising module, to generate updated address range information for use by the address information advertising module.

17. A node as defined in claim 16 in which said addresses include at least one unicast address.

18. A node as defined in claim 16 in which said addresses include at least one multicast address.

19. A node as defined in claim 16, the node including a proxy node and a message packet switching node, the proxy node being configured to engage in said negotiation operation and the message packet switching node being configured to route message packets received thereby.

20. A node as defined in claim 16 in which said negotiation module, during the negotiation operation, is configured to i. generate an address negotiation packet for transfer to said other node, the address negotiation packet identifying addresses for which the node is responsible in an overlapping address region comprising the portion of the other node's address range which overlaps with the node's address range; and
ii. generate the updated address range information in response to receipt of an address negotiation packet received from said other node including identification of addresses for which the other node is responsible in the overlapping address range.

21. A node as defined in claim 20 in which said negotiation module is configured to, in generating the address negotiation packet for transfer to the other node, include at least one address for which the node is responsible in the overlapping address range.

22. A node as defined in claim 21 in which said negotiation module is configured to, in generating the address negotiation packet for transfer to the other node, include an address above the lowest address for which the other node is responsible for which the node has been notified in the overlapping address range.

23. A node as defined in claim 22 in which said negotiation module is configured to, in each of a series of iterations, include in an address negotiation packet generated during the respective iteration an address above the lowest address for which the other node is responsible for which the node has been notified in the overlapping address range.

24. A node as defined in claim 21 in which said negotiation module is configured to, in generating the address negotiation packet for transfer to the other node, include an address below the highest address for which the other node is responsible for which the node has been notified in the overlapping address range.

25. A node as defined in claim 24 in which said negotiation module is configured to, in each of a series of iterations, include in an address negotiation packet generated during the respective iteration an address below the highest address for which the other node is responsible for which the node has been notified in the overlapping address range.

26. A node as defined in claim 21 in which said negotiation module is configured to, in generating the address negotiation packet for transfer to the other node, include a plurality of addresses for which the node is responsible in the overlapping address range.

27. A node as defined in claim 20 in which said negotiation module is configured to, in generating the address negotiation packet for transfer to the other node, include an indication, for each of a series of address segments in the overlapping address range, whether the node has an address for which it is responsible in the respective address segment.

28. A node as defined in claim 27 in which said negotiation module is configured to, in each of a series of iterations, in generating the address negotiation packet for transfer to the other node, include an indication, for each of a series of address segments in the overlapping address range, whether the node has an address for which it is responsible in the respective address segment, in each iteration the negotiation module dividing each segment which contains at least one address for which both the node and the other node are responsible into a series of finer segments and providing an indication as to whether the node has an address therein for which it is responsible.

29. A node as defined in claim 16 in which the negotiation module is configured to generate the updated address range information identifying an aggregation of a series of addresses for which it is responsible which does not include an address for which the other node is responsible.

30. A method of operating a node for use in a network comprising the steps of:

A. generating an address negotiation packet for transmission to another node in the network, the address information advertising module being configured to initially provide an address range encompassing addresses for which the node is responsible, and subsequently selectively provide updated address range information;

B. receiving address negotiation packets from an other node in the network including address information therefor; and C. engaging in a negotiation operation, in response to receipt of address information from said other node representing an address range overlapping the address range defined by the address information in the address negotiation packet generated by the address information advertising module, to generate updated address range information for use by the address information advertising module defining a range of addresses for which said node is responsible which does not overlap with an address for which said other node is responsible.

31. A method as defined in claim 30 in which said addresses include at least one unicast address.

32. A method as defined in claim 30 in which said addresses include at least one multicast address.

33. A method as defined in claim 30 in which said negotiation step includes the steps of:

A. generating an address negotiation packet for transfer to said other node, the address negotiation packet identifying addresses for which the node is responsible in an overlapping address region comprising the portion of the other node's address range which overlaps with the node's address range; and B. generating the updated address range information in response to receipt of an address negotiation packet received from said other node including identification of addresses for which the other node is responsible in the overlapping address range.

34. A method as defined in claim 33 in which said address negotiation packet generating step includes the step of, in generating the address negotiation packet for transfer to the other node, including at least one address for which the node is responsible in the overlapping address range.

35. A method as defined in claim 34 in which said address negotiation packet generating step includes the step of, in generating the address negotiation packet for transfer to the other node, including an address above the lowest address for which the other node is responsible for which the node has been notified in the overlapping address range.

36. A method as defined in claim 35 in which said address negotiation packet generating step includes the step of, in each of a series of iterations, including in an address negotiation packet generated during the respective iteration an address above the lowest address for which the other node is responsible for which the node has been notified in the overlapping address range.

37. A method as defined in claim 33 in which said address negotiation packet generating step includes the step of, in generating the address negotiation packet for transfer to the other node, including an address below the highest address for which the other node is responsible for which the node has been notified in the overlapping address range.

38. A method as defined in claim 37 in which said address negotiation packet generating step includes the step of, in each of a series of iterations, including in an address negotiation packet generated during the respective iteration an address below the highest address for which the other node is responsible for which the node has been notified in the overlapping address range.

39. A method as defined in claim 33 in which said address negotiation packet generating step includes the step of, in generating the address negotiation packet for transfer to the other node, including a plurality of addresses for which the node is responsible in the overlapping address range.

40. A method as defined in claim 33 in which said address negotiation packet generating step includes the step of, in generating the address negotiation packet for transfer to the other node, including an indication, for each of a series of address segments in the overlapping address range, whether the node has an address for which it is responsible in the respective address segment.

41. A method as defined in claim 40 in which said address negotiation packet generating step includes the step of, in each of a series of iterations, in generating the address negotiation packet for transfer to the other node, including an indication, for each of a series of address segments in the overlapping address range, whether the node has an address for which it is responsible in the respective address segment, in each iteration each segment which contains at least one address for which both the node and the other node are responsible being divided into a series of finer segments and an indication being provided as to whether the node has an address therein for which it is responsible.

42. A method as defined in claim 30 in which the updated address range information generating step includes the step of generating the updated address range information identifying an aggregation of a series of addresses for which it is responsible which does not include an address for which the other node is responsible.

43. A computer program product for use in connection with a digital computer to control a node for use in a network, the computer program product comprising a machine-readable medium having encoded thereon:

A. an address information advertising module configured to generate an address negotiation packet for transmission to another node, the address information advertising module being configured to initially provide an address range encompassing addresses with which the node is associated, and subsequently selectively provide updated address range information;

B. an address information receiving module being configured to receive address negotiation packets from said other node including address information therefor; and C. a negotiation module being configured to engage in the negotiation operation, in response to receipt by the address information receiving module of address information from said other node representing an address range overlapping the address range defined by the address information in the address negotiation packet generated by the address information advertising module, to generate updated address range information for use by the address information advertising module.

44. A computer program product as defined in claim 43 in which said addresses include at least one unicast address.

45. A computer program product as defined in claim 43 in which said addresses include at least one multicast address.

46. A computer program product as defined in claim 43 in which said negotiation module, during the negotiation operation, is configured to enable the computer to i. generate an address negotiation packet for transfer to said other node, the address negotiation packet identifying addresses for which the node is responsible in an overlapping address region comprising the portion of the other node's address range which overlaps with the node's address range; and ii. generate the updated address range information in response to receipt of an address negotiation packet received from said other node including identification of addresses for which the other node is responsible in the overlapping address range.

47. A computer program product as defined in claim 46 in which said negotiation module is configured to enable the computer to, in generating the address negotiation packet for transfer to the other node, include at least one address for which the node is responsible in the overlapping address range.

48. A computer program product as defined in claim 47 in which said negotiation module is configured to enable the computer to, in generating the address negotiation packet for transfer to the other node, include an address above the lowest address for which the other node is responsible for which the node has been notified in the overlapping address range.

49. A computer program product as defined in claim 48 in which said negotiation module is configured to enable the computer to, in each of a series of iterations, include in an address negotiation packet generated during the respective iteration an address above the lowest address for which the other node is responsible for which the node has been notified in the overlapping address range.

50. A computer program product as defined in claim 47 in which said negotiation module is configured to enable the computer to, in generating the address negotiation packet for transfer to the other node, include an address below the highest address for which the other node is responsible for which the node has been notified in the overlapping address range.

51. A computer program product as defined in claim 50 in which said negotiation module is configured to enable the computer to, in each of a series of iterations, include in an address negotiation packet generated during the respective iteration an address below the highest address for which the other node is responsible for which the node has been notified in the overlapping address range.

52. A computer program product as defined in claim 47 in which said negotiation module is configured to enable the computer to, in generating the address negotiation packet for transfer to the other node, include a plurality of addresses for which the node is responsible in the overlapping address range.

53. A computer program product as defined in claim 46 in which said negotiation module is configured to enable the computer to, in generating the address negotiation packet for transfer to the other node, include an indication, for each of a series of address segments in the overlapping address range, whether the node has an address for which it is responsible in the respective address segment.

54. A computer program product as defined in claim 43 in which said negotiation module is configured to enable the computer to, in each of a series of iterations, in generating the address negotiation packet for transfer to the other node, include an indication, for each of a series of address segments in the overlapping address range, whether the node has an address for which it is responsible in the respective address segment, in each iteration the negotiation module dividing each segment which contains at least one address for which both the node and the other node are responsible into a series of finer segments and providing an indication as to whether the node has an address therein for which it is responsible.

55. A computer program product as defined in claim 43 in which the negotiation module is configured to enable the computer to generate the updated address range information identifying an aggregation of a series of addresses for which it is responsible which does not include an address for which the other node is responsible.

* * * * *

UNITED STATES PATENT AND TRADEMARK OFFICE
CERTIFICATE OF CORRECTION

PATENT NO. : 6,473,431 B1
DATED : October 29, 2002
INVENTOR(S) : Radia J. Perlman et al.

It is certified that error appears in the above-identified patent and that said Letters Patent is hereby corrected as shown below:

Column 3,
Line 1, "can be readily" should read -- can readily --;

Column 6,
Line 17, "$A_{n',1} < A_{n',2} < A_{n',2} < ...$" should read -- $A_{n',1} < A_{n',2} < ...$ --;

Line 30, "$A_n",_{Dn"}$," should read -- $A_{n'},_{Dn"}$, --;

Column 7,
Line 3, "$A_{n",a}$," should read -- $A_{n',a}$, --;

Line 19, "$[A_{n',a30\ 1}, A_{n'Dn'}]$," should read -- $[A_{n',a+1}, A_{n',Dn'}]$, --;

Line 19, "$A_{,a+1}$" should read -- $A_{n',a+1}$ --;
Line 33, "0, where" should read -- , where --;

Column 8,
Line 43, "$[A_{",1} A_{n",Dn"}]$" should read -- $[A_{n",1}, A_{n",Dn"}]$ --;

Column 9,
Line 40, "$A_{n',a} < A_{n',c} < A_{n",k'1} < A_{n',c+1}$" should read -- $A_{n',a} < A_{n',c} < A_{n",k'} < A_{n',c+1}$ --;

Line 44, "$[_{n',c+1}, A_{n',k}]$," should read -- $[A_{n',c+1}, A_{n',k}]$, --; and Column 11,
Line 57, "$[A_{n',}, A_a)$" should read -- $[A_{n',1}, A_a)$ --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,473,431 B1
DATED         : October 29, 2002
INVENTOR(S)   : Radia J. Perlman et al.

It is certified that error appears in the above-identified patent and that said Letters Patent is hereby corrected as shown below:

<u>Column 6,</u>
Line 43, "11(n'n)'s)" should read -- 11(n')'s) --

Signed and Sealed this

Third Day of August, 2004

JON W. DUDAS
*Acting Director of the United States Patent and Trademark Office*